United States Patent [19]

Kim

[11] Patent Number: 4,618,428
[45] Date of Patent: Oct. 21, 1986

[54] PROCESS FOR RECOVERY OF ZINC FROM PLATING WASTE SOLUTIONS

[75] Inventor: Bang M. Kim, Schenectady, N.Y.

[73] Assignee: General Electric Company, Schenectady, N.Y.

[21] Appl. No.: 407,961

[22] Filed: Aug. 13, 1982

[51] Int. Cl.⁴ .............................................. B01D 13/00
[52] U.S. Cl. ........................... 210/648; 204/DIG. 13; 423/99; 423/DIG. 14
[58] Field of Search ......... 204/55 R, 180 P, DIG. 13; 210/641, 644, 648, 805, 806; 423/99, DIG. 14

[56] References Cited

U.S. PATENT DOCUMENTS

| | | |
|---|---|---|
| 3,956,112 | 5/1976 | Lee et al. |
| 3,957,504 | 5/1976 | Ho et al. .......................... 204/106 X |
| 3,969,478 | 7/1976 | Zelikman et al. ...................... 423/54 |
| 4,118,295 | 10/1978 | Korenowski et al. .............. 204/151 |
| 4,144,145 | 3/1979 | Watanabe et al. ................. 204/97 X |
| 4,306,946 | 12/1981 | Kim ....................................... 204/51 |
| 4,357,220 | 11/1982 | Eisenmann ............. 204/DIG. 13 X |

OTHER PUBLICATIONS

Baker, R. W. et al., "Coupled Transport Membranes", J. of Memb. Science, 2(1977), 213–233.

Flett, D. S. et al., "The Recovery of Molybdenum from Spent Mandrel Acid by Solvent Extraction", Proc. Inter. Solvent Extraction Conf. Held Sep. 6–12, 1980 in Liege Belgium, pp. 1–10.

Skovronek, H. S. et al., "Advanced Treatment Approaches for Metal Finishing Waste Waters, Part II" Plating and Surface Finishing, Nov. 1977, pp. 24, 26, 28, 30 and 31.

Primary Examiner—David Sadowski
Attorney, Agent, or Firm—Lawrence D. Cutter; James C. Davis, Jr.; Marvin Snyder

[57] ABSTRACT

A membrane-based solvent extraction system is used to separate zinc from plating wastes and to recycle the concentrated zinc solution to the plating bath. Di-2 ethylhexylphosphoric acid (DEHPA) is used as an organic carrier, and an acid or salt solution is used as a stripping agent in this process.

10 Claims, 2 Drawing Figures

PROCESS FOR RECOVERY OF ZINC FROM PLATING WASTE SOLUTIONS

BACKGROUND OF THE INVENTION

The present invention relates to a method for recovery of zinc from plating waste water solutions and the return of concentrated zinc solution to the plating bath. More particularly, the present invention relates to membrane-based solvent extraction processes.

In recent years, there has been an increasing need for the removal of metal ions from aqueous solutions not only for reasons of pollution control, but also for the purpose of recovering valuable mineral species. In particular, the recovery of zinc from the waste water solution from plating plants has been found to be particularly desirable for both of these reasons. Furthermore, recycling of zinc values contained within the waste water solution back to the plating bath would significantly increase the economics involved in zinc plating operations.

In the past, electrolytic reactors have been developed and employed for the removal and recovery of metals from plating plant waste water solutions. Although such processes are applicable to the recovery of many heavy metals, these processes are not generally effective for the treatment of acidic zinc solutions. This is mainly due to the low current efficiencies associated with a competing reaction (that is, hydrogen evolution) occurring at the cathode. Recycling metals using these electrolytic processes requires disassembly of the cell to reuse the metal deposits or dissolution of the metal with an acid. In contrast, the process disclosed herein produces a solution concentrated with zinc and recycles it directly to the plating bath solution without the requirement of any further treatment.

Other processes for the separation of mineral values from various solutions include solvent extraction methods. The separation of molybdenum from tungsten-containing solutions is described in the article "The Recovery of Molybdenum From Spent Mandrel Acid by Solvent Extraction" by D. S. Flett, J. Mellig and E. W. West on pages 80-149 of the Proceedings of the International Solvent Extraction Conference, held Sept. 6-12, 1980 in Liege, Belgium. Another solvent extraction process for metal separation is disclosed in U.S. Pat. No. 3,969,478, issued July 13, 1976 to Zelikman et al. Although such methods are capable of separation and/or the recycling of metals, these processes have generally exhibited one or more problems. For example, a significant problem is the loss of solvent during the process. Another problem that occurs is the difficulty encountered in the separation of organic and aqueous phases in the resulting solutions. Additionally, these processes generally require multi-stage operation to achieve a high enrichment factor. Moreover, they can be particularly susceptible to particulate contamination.

In addition to the above electrolytic and solvent extraction methods for metal separation, various membrane-based methods have been employed in the separation of metal values. In particular, in U.S. Pat. No. 4,306,946, issued Dec. 22, 1981 in the name of the instant inventor, Donnan dialysis is employed as a continuous ion exchange process. This process employs a solid ion exchange membrane as a barrier between feed and eluant solutions. However, the method suffers from low removal rate, which is determined by the diffusion rate of ions through the solid, ion exchange membrane. However, it is nonetheless a continuous method and provides many advantages over conventional solvent extraction methods employing mixer/settler systems. Another form of membrane-based metal recovery process is described in the article "Coupled Transport Membranes" by R. W. Baker et al. in the *Journal of Membrane Science*, Vol. 2, pages 213-233, 1977. The process described therein employs a porous membrane which is impregnated with an organic absorbing medium. However, this process exhibits certain short-comings, particularly membrane instability. Membrane extraction performance deteriorates significantly due to the loss of the organic medium and also due to the filling of the pores with the aqueous solution. This happens since the organic medium is leached out of the pores or pushed out of the pores due to the pressure imbalance across the membrane. The present invention is distinct from the method described therein in many respects, most notably in that the liquid ion exchange material is not impregnated in the membrane but rather is disposed in a recirculating system between separate membranes in distinct fluid-tight chambers. Accordingly, the problem of the loss of ion exchange material is not present.

Additionally, a process for hydrometallurgical extraction is described in U.S. Pat. No. 3,957,504, issued May 18, 1976 to Ho et al. FIG. 4 of the patent to Ho et al. is particularly relevant in that it illustrates a hydrometallurgical extraction process flow diagram in which a chelating fluid is recycled back to a first ionic membrane extraction unit. However, no provision is made in the apparatus for treatment of the recycled chelating solution. In particular, there is no provision for the use of an aqueous/organic separator which the present inventor has found to be particularly effective in selectively isolating and enriching desired metallic species using porous membranes.

SUMMARY OF THE INVENTION

In accordance with a preferred embodiment of the present invention, a method for recovery of zinc from plating waste water or other solutions containing zinc comprises a membrane-based solvent extraction system in which the waste water solution is contacted with a first side of a first membrane; the other side of the membrane is contacted with an organic zinc-selective solvent for the selected passage of zinc through the membrane; the solvent is then circulated and contacted with the first side of a second membrane, the other side of which is contacted with a stripping solution for the selective passage of zinc through the second membrane. In a preferred embodiment of the present invention, the organic zinc-selective solvent comprises di-2 ethylhexylphosphoric acid (DEHPA) and further employs an acidic or salt stripping solution for the selective passage of zinc through the second membrane, the resulting stripping solution with a high concentration of zinc being returned to the plating bath.

Accordingly, it is an object of the present invention to provide a simple and effective process for the separation and recovery of zinc from plating waste water.

It is also an object of the present invention to provide a plating process in which zinc is recycled to the plating bath.

It is a further object of the present invention to provide a metal separation process which is highly selective to zinc.

Lastly, it is an object of the present invention to provide a membrane-based solvent extraction process in which solvent extraction loss is minimized and in which minimum contamination of the plating or rinse tank solutions by organics is achieved.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
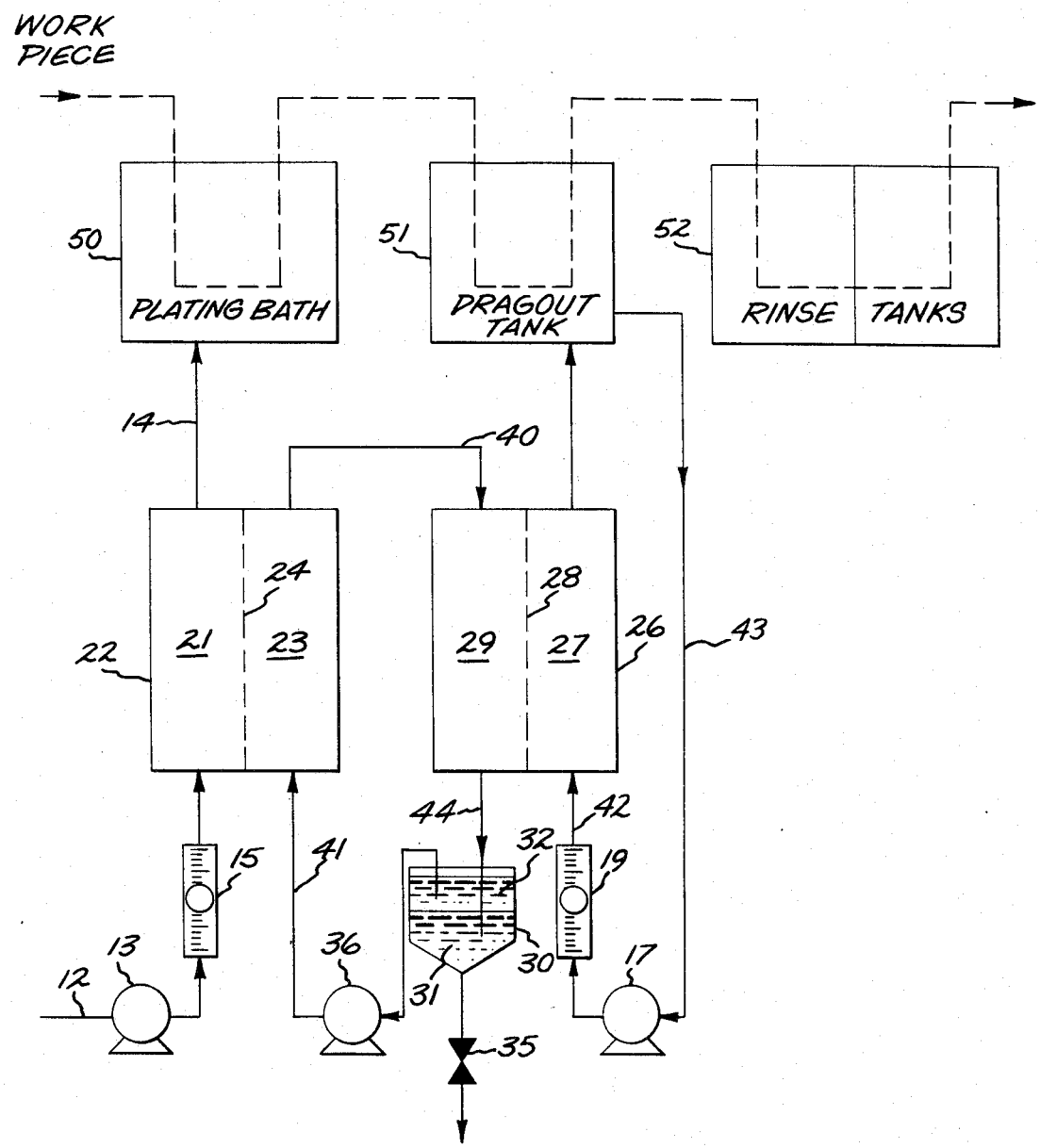
FIG. 1 is a schematic flow diagram illustrating a preferred embodiment of the present invention.

FIG. 1 illustrates a preferred embodiment of the present invention and particularly points out the relationship of the membrane-based solvent extraction apparatus to the conventional plating operation baths. In a conventional plating operation, a workpiece is first immersed in plating bath 50. Following the plating operation, the workpiece is moved as shown to dragout tank 51 prior to entering rinse tanks 52. It is in dragout tank 51 that solutions containing high concentrations of zinc normally tend to accumulate. Additionally, plating plant operating systems also include rinse tanks 52 often containing a sequence of baths through which the workpiece is processed. Accordingly, rinse tank 52 and/or subsequent rinse tanks are generally found to contain solutions having relatively low concentrations of zinc. However, it is to be specifically noted that the solutions contained in rinse tanks such as rinse tank 52 and subsequent rinse tanks may also be processed by the membrane-based solvent extraction system of the present invention, although the concentration of zinc metal ions in these solutions may mitigate against using the present invention, especially for zinc recovery. However, the present invention is nonetheless highly useful for pollution control even for low zinc concentrations.

In accordance with the present invention, solution 43 is removed from dragout tank 51 by means of pump 17. Flowmeter 19 is included so that proper flow rates may be maintained through the system. Accordingly, pump 17 (and pump 13 discussed below) preferably includes means therein for selectively controlling the fluid flow rate. Solution 42 from flowmeter 19 is contacted with a first side of membrane 28 which is disposed within fluid-tight chamber 26 so that membrane 28 divides the chamber into volumes 27 and 29 as shown. Volume 29 contains a circulating solution containing an organic zinc-selective solvent such as DEHPA. This solvent acts to selectively transport $Zn^{++}$ ions across membrane 28. Solution 43, in which zinc ions are concentrated, is thus ultimately returned to dragout tank 51 but in a condition in which the zinc ion concentration has been significantly reduced.

The second side of membrane 28, as mentioned above, is contacted with an organic zinc-selective solvent such as DEHPA. Solution 44, from volume 29, containing DEHPA which has been reacted with zinc ions, is transported to separator 30. Separator 30 may simply comprise a settling tank in which the denser aqueous layer 31 is produced at the bottom of the tank and is periodically removed through valve 35. The upper deaquified layer 32 is transported by means of pump 36 to volume 23. Thus, the solvent is seen to absorb zinc ions in volume 29 and to have zinc ions desorbed therefrom in volume 23.

This zinc desorption occurs in fluid-tight chamber 22 containing volumes 21 and 23 which are defined, at least in part, by means of the above-mentioned membrane 24. The second side of membrane 24, that is the side thereof which faces volume 21, is contacted with an acidic or salt stripping solution 12 supplied thereto by means of pump 13. The fluid flow rate of solution 12 into volume 21 is indicated by flow rate meter 15 which is preferably present so that controllable pump 15 may be operated so as to provide appropriate rates of solution flow. The stripping solution operates to selectively absorb zinc ions through membrane 24 so as to create product solution 14 which contains a high concentration of zinc. Solution 14 is, accordingly, returned to plating bath 50 thus completing the zinc recovery and recycling.

Accordingly, it is seen that in the apparatus shown in FIG. 1, fluid-tight chamber 26 together with its associated membrane 28, operate as an extraction module and that fluid-tight chamber 22 together with its associated membrane 24, operate as a stripping module for removal of the zinc metal ions. The organic absorbing medium is continuously cycled in a closed loop from the extraction module to the stripping module and back to the extraction module. Zinc ions in the dragout tank, which is the first rinse tank in a conventional plating operation, are picked up by the absorbing medium and recovered in the stripping module by contact across membrane 24 with the stripping solution. The resulting product stream 14 containing a highly concentrated zinc solution, is then recycled back to plating bath 50.

The organic zinc-selective solvent DEHPA is a preferred solvent for use in the present invention. However, it is also noted that the DEHPA solution may be mixed with other organic solvents to increase the zinc separation factor and to improve the compatability of the solutions with the membranes employed.

DEHPA, which has a high selectivity for zinc, is used as the preferred organic solvent in the present invention. Its reaction with zinc is represented by the following equation:

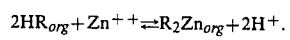

$$2HR_{org} + Zn^{++} \rightleftharpoons R_2Zn_{org} + 2H^+.$$

In this equation, the subscript "org" designates the particular constituent as being organic.

The membranes preferred for the operation of the present invention are those that are used for ultrafiltration, reverse osmosis, and dialysis. The membranes of the present invention are also preferably selected to be capable of selective discrimination between the passage of organic and aqueous phases. Furthermore, in the present invention, the hollow fiber form of membrane structure is also preferred.

Figure 2:
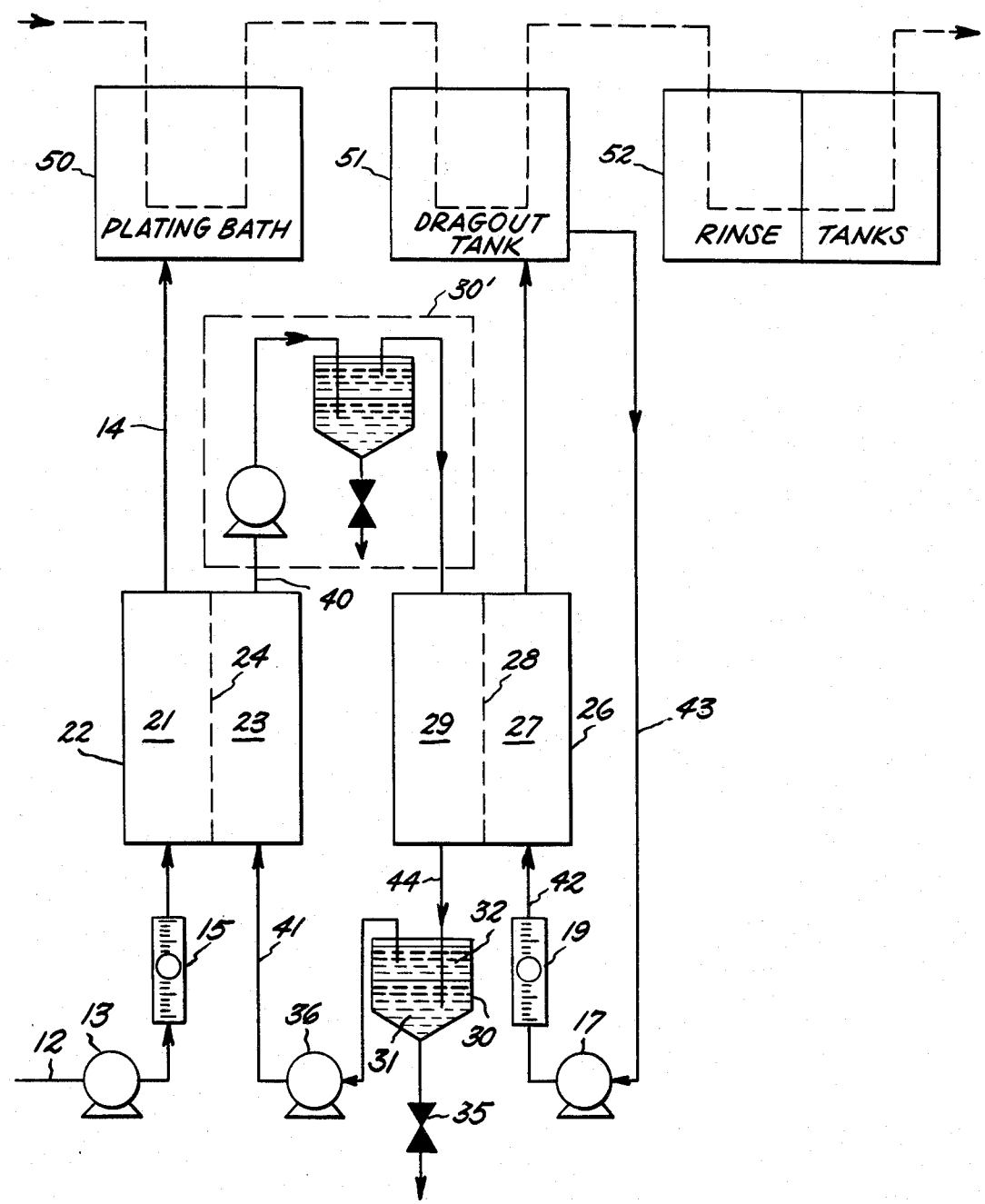
FIG. 2 is a schematic flow diagram illustrating an alternate embodiment of the present invention, particularly illustrating the employment of two aqueous separators.

It should also be noted that it has been found that the presence of aqueous solution in the circulating organic solvent significantly deteriorates the performance of the extraction system. Accordingly, aqueous separator 30 is a desirable portion of the preferred embodiment of the present invention. However, while FIG. 1 illustrates the presence of only a single aqueous separator operating to treat solution 44 from volume 29, an additional, or substitute, aqueous separator 30' may be employed to treat solution 40 in a similar fashion as is shown in FIG. 2.

Accordingly, from the above it will be appreciated that the present invention provides a membrane-based solvent extraction method for the removal of zinc from zinc-containing solutions. It will further be appreciated that the present invention is particularly applicable not only to the recovery but also to the recycling of zinc from plating plant operations. It will also be appreciated that the method of the present invention provides certain significant advantages. Among these are the fact that the present invention comprises an essentially closed loop system providing for the highly selective separation of zinc. The method also provides for a minimal loss of organic solvent material since the solvent is never in direct contact with either the rinse water or plating bath solutions. Accordingly, these bath solutions are only minimally affected by contamination from the organic intermediary exchange solution. Furthermore, the method of the present invention not only provides for the removal of zinc but it also provides the capability of recycling it directly to the plating bath solution.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for recovery of zinc from an aqueous zinc containing solution, said method comprising the steps of:
   contacting the aqueous zinc containing solution with a first side of a first membrane;
   contacting the second side of said first membrane with an organic zinc-selective solvent for the selective passage of zinc through said first membrane;
   contacting the first side of a second membrane with a solvent which has been in contact with said first membrane;
   removing aqueous solution from said solvent;
   contacting the second side of said first membrane with the solvent which has been in contact with the first side of said second membrane; and
   contacting the second side of said second membrane with a stripping solution for the selective passage of zinc through said second membrane.

2. The method of claim 1 in which said solvent comprises di-2-ethylhexylphosphoric acid.

3. The method of claim 1 in which said stripping solution comprises a solution selected from the group consisting of acidic solutions and salt solutions.

4. The method of claim 1 including the further step of removing aqueous solution from the solvent which has been contacted with the first side of said second membrane prior to contacting said solvent with the second side of said first membrane.

5. A method for recovery of zinc from a plating process including a plating bath and a rinse bath source of aqueous, zinc containing solution, said method comprising the method of claim 1 together with the steps of:
   adding the stripping solution which has been in contact with the second side of said second membrane to said plating bath; and
   recirculating the aqueous zinc containing solution, which has been in contact with the first side of said first membrane, to said rinse bath.

6. A method for recovery of zinc from aqueous solutions containing zinc, said method comprising the steps of:
   contacting the aqueous zinc containing solution with a first side of a first membrane;
   contacting the second side of siad first membrane with an organic zinc-selective solvent for the selective passage of zinc through said first membrane;
   removing aqueous solution from said solvent;
   contacting the first side of a second membrane with the solvent which has been in contact with said first membrane;
   contacting the second side of said first membrane with the solvent which has been in contact with the first side of said second membrane; and
   contacting the second side of said second membrane with a stripping solution for the selective passage of zinc through said second membrane.

7. The method of claim 6 in which said solvent comprises di-2-ethylhexylphosphoric acid.

8. The method of claim 6 in which the stripping solution comprises a solution selected from the group consisting of acidic solutions or salt solutions.

9. The method of claim 6 including the further step of removing aqueous solution which has been contacted with the first side of said second membrane prior to contacting said solvent with the second side of said first membrane.

10. A method for recovery of zinc from a plating process including a plating bath and a rinse bath source of aqueous zinc containing solution, said method comprising the method of claim 6 together with the steps of:
   adding the stripping solution which has been in contact with the second side of said second membrane to said plating bath; and
   recirculating the aqueous zinc containing solution which has been in contact with the first side of said first membrane to said rinse bath.

* * * * *